Nov. 1, 1966  L. M. FORBUSH  3,282,241
BRAKE LINING WEAR SIGNAL INCORPORATED IN SHOE ADJUSTING LINK
Filed Sept. 20, 1965
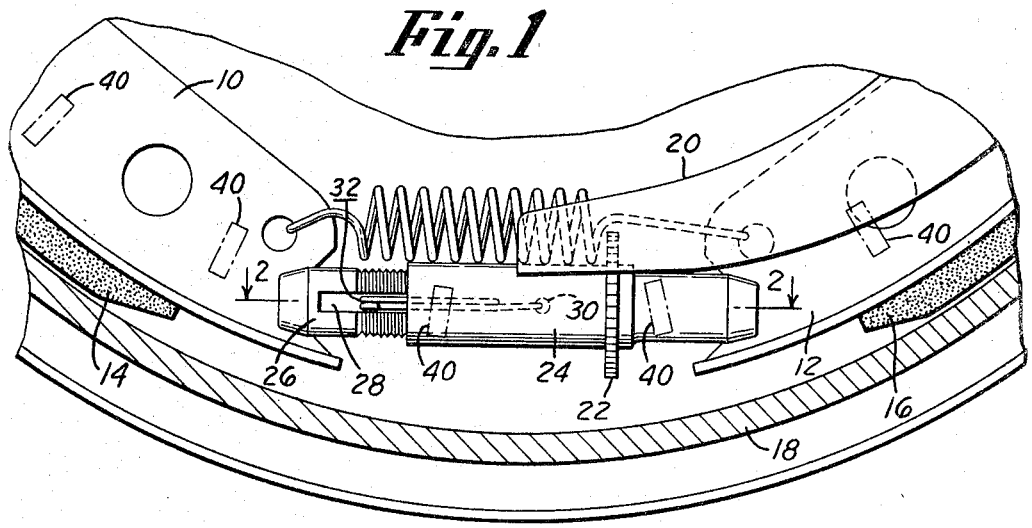
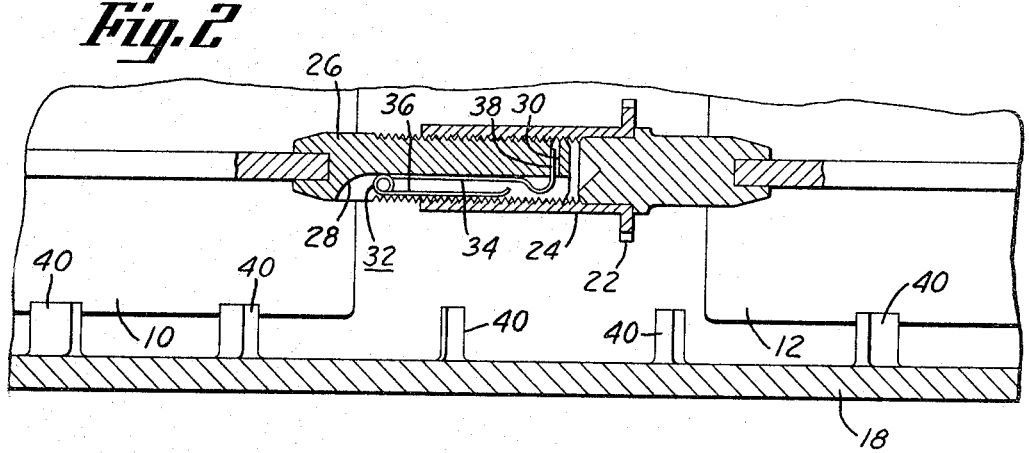
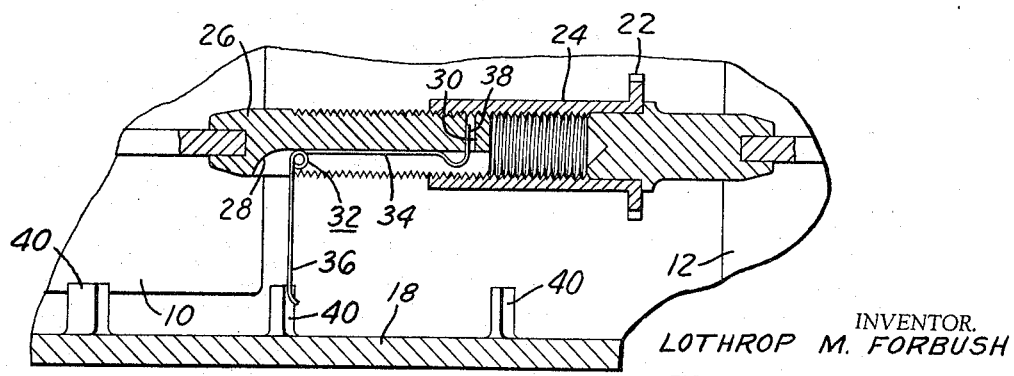
INVENTOR.
LOTHROP M. FORBUSH
BY
Donald P. Selvecki
ATTORNEY

3,282,241
BRAKE LINING WEAR SIGNAL INCORPORATED IN SHOE ADJUSTING LINK

Lothrop M. Forbush, Birmingham, Mich., assignor to General Motors Corporation, Detroit, Mich., a corporation of Delaware
Filed Sept. 20, 1965, Ser. No. 488,589
5 Claims. (Cl. 116—67)

This invention relates to braking mechanisms and more particularly to a device providing an audible sound when brake linings are adjusted to a point equal to the minimum acceptable brake lining thickness.

Automatic brake adjusters in common use automatically compensate for the decreased clearance between brake linings and a rotating drum caused by brake lining wear. A vehicle operator, therefore, always has a responsive brake pedal due to the automatic adjusting, but it is possible for the automatic adjusting to continue to a point where the brake lining material on the shoes is dangerously thin. Were this adjusting to take place indefinitely, the metallic portion of the brake shoes would eventaully contact the brake drum causing a decrease in braking efficiency and possible damage to braking parts. It is desirable in brakes equipped with an automatic adjuster to provide a warning for a vehicle operator that the brake lining thickness has decreased below acceptable minimums.

It is an object of the present invention to provide an improved audible warning device which alerts a vehicle operator of a vehicle having an automatic brake adjuster that brake lining wear has exceeded predetermined limits.

It is another object of the present invention to provide a simple and economical method of carrying out the aforementioned object.

It is still another object of the present invention to provide an improved brake lining wear sensing device which is readily adaptable for use in braking mechanisms of common design.

Further objects and advantages of the present invention will be apparent from the following description, reference being had to the accompanying drawings wherein a preferred embodiment of the present invention is clearly shown.

In the drawings:

FIGURE 1 is a partial sectional view of the subject invention shown in its operative environment;

FIGURE 2 is a sectional view of the subject invention taken along line 2—2 of FIGURE 1 showing the warning device in poised disposition;

FIGURE 3 is a sectional view of the subject invention similar to FIGURE 2 in which the subject invention is shown in actuated disposition.

Referring to FIGURE 1, brake shoes 10 and 12 carrying linings 14 and 16, respectively, are frictionally engageable with brake drum 18 to bring about a braking action. Automatic adjuster lever 20 operates in the same manner as the adjusting mechanism described in U.S. Patent No. 3,050,157. Adjusting lever 20 is pivoted into engagement with star wheel 22 to engender a rotating motion therein to cause an expansion of relative movable portion 24 with respect to relatively fixed portion 26.

Referring to FIGURE 2, it is seen that fixed portion 26 is threaded into portion 24 bringing about a turnbuckle type action when star wheel 22 is rotated. Elongated slot 28 is formed in fixed portion 26 and includes aperture 30 running substantially at right angles to slot 28. Spring metal member 32, sometimes referred to herein as resilient means, includes fixed arm 34 and movable arm 36. Arm 36 is bent toward fixed arm 34 and held in compressed disposition while movable portion 24 is threaded onto fixed portion 26. Retaining arm 38 extends into aperture 30 to prevent the casual withdrawal of spring metal member 32 from slot 28. As shown in FIGURE 2, spring metal member 32 is in a compressed disposition and is shown in free disposition in FIGURE 3.

Upstanding flanges 40 carried on the surface of brake drum 18 are in interfering relationship with respect to movable arm 36 when it assumes a free disposition. The dimensions of the fixed portion 26 and movable portion 24 forming the turnbuckle or expandable means are so designed that the length of movable arm 36 is proportional to the acceptable amount of brake lining thickness. When the expandable means assumes an expanded disposition which properly positions linings 14 and 16 relative to drum 18 at a point where only minimum acceptable brake lining wear remains, movable arm 36 is no longer retained by movable portion 24 and assumes the free disposition shown in FIGURE 3.

In operation, the braking mechanism shown in FIGURE 1 is automatically adjusted as brake lining wear occurs during repeated brake applications resulting in the continual rotation of star wheel 22 to a point where movable portion 24 moves substantially from the position shown in FIGURE 2 to the position shown FIGURE 3. It is understood that, as the movable portion 24 is threaded outwardly by the adjusting lever 20, movable arm 36 is retained in compressed disposition. When movable portion 24 threads out to an amount illustrated in FIGURE 3, the retained movable arm 36 becomes free and assumes the disposition illustrated in FIGURE 3.

After movable arm 36 becomes free, it moves into interfering relationship with respect to upstanding flanges 40. Thereafter, as drum 18 rotates, an audible sound is created by movable arm 36 contacting flanges 40 during rotation of drum 18. This noise alerts a vehicle operator to the fact that brake lining wear has progressed to a point where only minimum acceptable thickness of brake lining remains and maintenance is necessary. Sufficient lining remains on the drum when this occurs so that a vehicle operator can, at his earliest convenience, replace the lining and resume a normal safe braking capability.

When the brake lining is replaced, movable arm 36 is compressed to the disposition shown in FIGURE 2 and movable portion 24 is threaded onto fixed portion 26. The inherent resiliency of spring metal member 32 allows usage of the device throughout the life of the vehicle, contributing effectively to the utility of the subject invention in that further cost is unnecessary. The designer of the subject mechanism can easily relate the thickness of the brake linings to the distance the movable portion 24 travels relative to fixed portion 26 during brake adjustments to establish the exact length required in a given installation of movable arm 36.

While the embodiment of the present invention, as herein disclosed, constitutes a preferred form, it is to be understood that other forms might be adopted.

What is claimed is as follows:

1. A brake wear sensing device for a brake system having an automatic adjuster, said device comprising: brake shoe means carried by a non-rotatable portion of a vehicle; turnbuckle means having an internal bore and being carried by said brake shoe means and expanding therewith as automatic brake adjusting takes place; brake drum means carried by a rotating portion of a vehicle proximate said turnbuckle means; and compressed spring means carried in said bore of said turnbuckle means and being adapted to assume a free form as said turnbuckle means assumes a predetermined amount of extension thereby interfering with said rotating brake drum means to create an audible noise indicative of shoe separation beyond predetermined limits.

2. A brake wear sensing device for a brake system having an automatic adjuster, said device comprising: brake shoe means carried by a non-rotatable portion of a vehicle; brake drum means carried by a rotating portion of a vehicle; expandable means carried between opposed ends of said brake shoe means that are automatically adjusted by said expandable means as brake lining wear occurs thereon, said expandable means having an internal chamber along the longitudinal axis thereof which becomes progressively more exposed as the expandable means assumes an elongated disposition; and resilient means compressibly carried in the internal chamber in the expandable means being progressively more exposed as the aperture is exposed during expansion of the expandable means, said resilient means including a holding portion and a portion adapted to spring out from said aperture as a predetermined amount of exposure is generated in said expandable means to move into interfering engagement with a surface of said brake drum means to cause an audible sound.

3. A brake wear sensing device for a brake system having an automatic adjuster, said device comprising: brake shoe means carried by non-rotatable portion of a vehicle; brake drum means carried by a rotating portion of a vehicle; expandable means having an internal chamber and carried between opposed ends of said brake shoe means that are automatically adjusted and maintaining engagement with said brake shoe means as wear on the linings occur and the brake shoes move apart; resilient means carried by the internal chamber of said expandable means in a compressed disposition and arranged to assume a free form as the expandable means expands a predetermined amount proportional to maximum acceptable brake lining wear; and means carried by said brake drum means rotating in juxtaposition to said expandable means, said means including spaced portions adapted to be struck by said resilient means when said resilient means assumes a free disposition thereby creating an audible sound as the brake drum rotates.

4. A brake wear sensing device according to claim 3 wherein said resilient means is a spring member assuming a substantially right angle shape relative to said expandable means when in free disposition.

5. A brake wear sensing device for a brake system having an automatic adjusted, said device comprising: brake shoe means carried by a non-rotatable portion of a vehicle; brake drum means carried by a rotating portion of a vehicle; expandable means including at least one fixed portion engaging said brake shoe means threadingly cooperating with an opposed relatively movable portion engaging an opposed portion of said brake shoe means, said expandable means being driven into expanded disposition by rotation of a star wheel carried by said relatively moving portion rotating in response to an automatic adjusting mechanism, said fixed portion including a slotted groove formed in the outer periphery thereof at least partially covered by the relatively moving portion; a spring metal member compressibly carried in said elongated groove and maintained in compressed disposition by said relatively moving portion when a threading engagement thereof with the fixed portion remains within predetermined limits; and upstanding members carried by a rotating brake drum in juxtaposition to said expandable means, said upstanding members movable in interfering relationship with respect to said spring metal member as it assumes a free position under conditions when the relatively movable portion expands relative to the fixed portion a predetermined amount proportional to the maximum acceptable brake lining wear thereby creating an audible sound.

References Cited by the Examiner

UNITED STATES PATENTS

| 2,580,482 | 1/1952 | Stukenborg et al. | 287—60 |
| 2,843,408 | 7/1958 | Stukenborg | 287—60 |
| 3,199,631 | 8/1965 | Blorkemeyer | 188—1 |
| 3,213,971 | 10/1965 | Moyer et al. | 188—1 |

LOUIS J. CAPOZI, *Primary Examiner.*